May 28, 1935. S. M. MARTIN, JR., ET AL 2,002,902
PROCESS FOR REMOVING GUM AND GUM FORMING CONSTITUENTS
FROM CRACKED PETROLEUM DISTILLATES
Filed Jan. 8, 1932
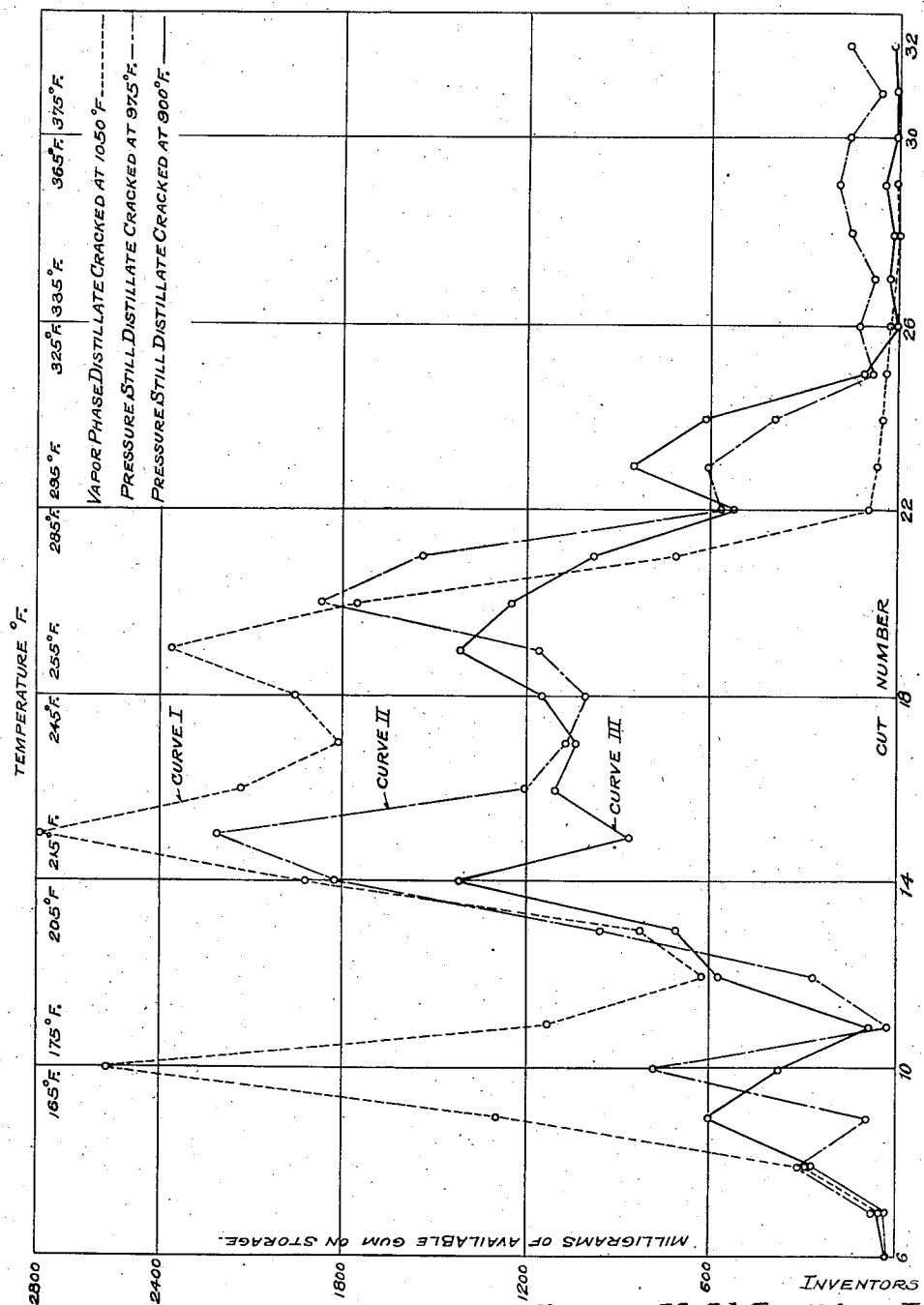
INVENTORS
Samuel M. Martin, Jr.,
William A. Gruse,
By K. P. McElroy
Attorney Patented May 28, 1935

2,002,902

UNITED STATES PATENT OFFICE 2,002,902

PROCESS FOR REMOVING GUM AND GUM FORMING CONSTITUENTS FROM CRACKED PETROLEUM DISTILLATES

Samuel M. Martin, Jr., Pittsburgh, and William A. Gruse, Wilkinsburg, Pa., assignors to Gulf Refining Company, Pittsburgh, Pa., a corporation of Texas Application January 8, 1932, Serial No. 585,570

11 Claims. (Cl. 196—23)

This invention relates to manufacture of petroleum distillates; and it comprises certain cracked naphtha petroleum distillates comprising a mixture of light and heavy fractions and being free from certain intermediate fractions containing the bulk of the gum and gum-forming constituents, or alternatively, distillates comprising a mixture of various fractions, the intermediate fractions thereof having been substantially freed from their natural content of gum and gum-forming constituents; and it further comprises a process of isolating from cracked light distillates such as gasoline, certain intermediate fractions containing a preponderance of the gum-forming constituents, quickly treating these to remove or substantially reduce the gum and gum-forming constituents and immediately thereafter returning the treated fractions to the bulk of the distillate from which they were isolated; and more specifically the invention comprises the treatment of certain pressure still distillates, to separate therefrom an intermediate boiling fraction comprising about one-third of the whole, the treatment of this fraction to remove or reduce the gum-forming constituents and the re-introduction of such treated fraction to the distillate from which it was derived; all as more fully hereinafter set forth and as claimed.

Distillates of the character from which motor fuels such as gasoline are produced are likely to contain a large amount of preformed gum as well as a large amount of gum-forming constituents which produce gum on storage. This is particularly true of distillates produced by either the vapor phase or pressure cracking processes. A large amount of gum-forming constituents occurs in certain fractions or cuts of such distillates. We have found that, whether the distillate is one produced by a high temperature pressure cracking process, by a relatively low temperature, pressure cracking process or by a vapor phase cracking process, the light ends and the heavy ends of such distillates are relatively free of gum and gum-forming constituents, whereas intermediate cuts contain relatively large amounts of gum and gum-forming constituents; and in particular certain intermediate cuts contain a preponderance of the gum and gum-forming constituents.

We have also found that in cracked naphtha distillates, the fractions or cuts containing a preponderance of the gum, seem to boil between certain rather narrow ranges. Particular cuts of a vapor phase distillate may contain more gum than the corresponding cuts of a pressure still distillate and particular cuts of a pressure still distillate made at high temperatures and pressures may contain more gum or gum-forming constituents than the corresponding cuts of a pressure still distillate made at lower pressures and temperatures, but comparable cuts from cracked naphtha distillates, however made, seem to follow a general curve and to contain more gum and gum-forming constituents than certain other cuts. Generally speaking these gums or gum-forming constituents always occur in intermediate cuts from the distillates but with these intermediate cuts there are certain cuts which contain more of the gum than other intermediate cuts.

The above facts may be illustrated by reference to the accompanying drawing in which Fig. 1 shows the relationship between what we term the "available gum on storage" and the various fractions or cuts obtained in our experiments. In this figure the values of the available gum occurring in the various fractions are plotted as ordinates against the fractions in which they occur, as abscissæ. The temperatures represented in the figure correspond to boiling points at atmospheric pressure. In order to obtain these curves we fractionated three widely different cracked naphtha distillates into 32 cuts at intervals of 10° F. Each of these cuts was then put through a test for its available gum, as described below. The results obtained upon the first 6 cuts are not shown in the figure. These cuts are substantially gum free and non-oxidizing. Hence their inclusion in Fig. 1 would be of no particular interest.

Curve I (dash line) in Fig. 1 represents the results obtained from a vapor phase distillate obtained by the cracking of a Venezuela crude oil at a temperature of about 1000° to 1050° F. and a pressure of 100 pounds. Curve II (represented by dash-dot line) represents the results obtained on a pressure still distillate from a mixed commercial gas oil, being a mixed paraffinic and naphthenic stock, cracked at 975° F., and at a pressure of about 200–250 pounds per square inch. Curve III (full line) represents the results obtained on a pressure still distillate derived from a stock made up chiefly of Mid-Continent paraffinic gas oil cracked at 900° F. and at a pressure of about 275 pounds. Still another gasoline, the results of which are not shown in the figure, has been fractionated and found to closely follow the curves shown in Fig. 1. This gasoline was produced from a reduced crude instead of from the whole crude or from a solar oil. This particular gasoline was appreciably more unsaturated and harder to refine than those illustrated in the figure, but it nevertheless was found to parallel the other curves very closely as to available gum content on storage.

It will be noted that all of the curves in Fig. 1 show at least three corresponding peaks of available gum content. The first peak occurs between the 9th and the 11th cuts or between the cuts obtained at temperatures of 145°–155° F. and 175°–185° F., respectively. The second peak occurs between the 13th and the 16th cuts, taken at temperatures of 195°–205° F. and 225°–235° F., respectively. The third peak occurs between the 18th and 21st cuts, taken at temperatures of 245°–255° F. and 275°–285° F., respectively. It will be noted that these peaks each occur on the average at temperature intervals 50° F. apart.

While any theory for the occurrence of these peaks will not change the efficacy of the methods which we have evolved for the elimination of the gum-forming constituents producing the same, it is our belief that these peaks can be explained on the basis that certain cyclic olefines and diolefines of the 6-carbon up to the 8-carbon series (substituted cyclopentenes, cyclo-hexenes, and cyclo-hexadienes, for example) occur in these particular fractions and are responsible for their available gum content. When the boiling points of the cyclo-olefines containing 6, 7 and 8 carbon atoms are marked on the curves of Fig. 1 they correspond strikingly well with the three peaks.

The cyclo-dienes appear to be the hydrocarbons which are most likely to be responsible for the available gum content of cracked gasoline. There is at least one reason for considering chiefly the 5-carbon and 6-carbon nuclear rings. These rings are more stable to rearrangement than the larger and smaller rings. It is probably for this reason that these are the ring systems best known.

A method which may be used for determining the available gum content of the various fractions of a fuel in order to produce curves such as those of Fig. 1 is as follows:

A measured sample of the distillate fraction, the available gum content of which is to be determined, is placed in a pressure type vessel. A small amount of water is kept in an open, separate compartment within this vessel. Oxygen under a pressure of 20 pounds per square inch is introduced, both the gasoline sample and the water being exposed to this oxygen atmosphere. The vessel is then stored at a temperature of 100° F. for a week. Pressure readings are taken at frequent intervals. The time required to produce a 5 per cent or a 10 per cent drop in pressure is recorded. At the end of the week the gasoline sample is evaporated in an atmosphere of steam. The gum remaining is weighed and calculated in milligrams per 100 cc. In such measurements we have found that the speed of oxidation and the residual gum content run parallel. Either can be used as a relative measure of the available gum content on storage.

It will be noted that the above test differs considerably from the ordinary oxygen stability test, which employs a pressure of 100 pounds per square inch of oxygen and a temperature of 212° F. The results of the two tests do not always agree, even in a relative manner. The usual oxygen stability test does not represent the true conditions found in storage and introduces several factors which may completely change the results obtained. The above test closely approximates actual storage conditions without the complications of high temperature or of catalysts.

The results plotted in Fig. 1, obtained by the test outlined, show that the available gum content of gasoline fractions derived from widely different sources follow regular curves showing peaks at corresponding intervals. Similar results would doubtless be produced in these gasoline fractions on storage. Our methods for eliminating gum and the gum-forming constituents from gasoline are based upon our findings as a result of the above described tests. Our methods, however, are not dependent upon these particular tests. It has been found, for example, that, when the same gasoline fractions are submitted to ultra-violet polymerization tests, the results show a striking parallelism to those found by the above tests.

To follow our procedure all that is necessary is the determination of the available gum content curves for several typical gasoline or naphtha distillates by the method previously described. These curves, for example those shown in Fig. 1, show the various cuts which contain the maximum gum-forming constituents. We then separate these particular cuts from the distillate to be refined either at the dephlegmating tower in the conversion operation or during re-distillation in the usual re-run stills. We then refine or treat the separated gum-containing fractions to remove the gum and gum-forming constituents and directly thereafter return the purified material to the bulk of the distillate from which it was derived. The separated fractions can be much more readily purified than can the gasoline as a whole before the separation.

In the separated fractions the gum-forming constituents are in highly concentrated form. They appear more highly reactive than when they are diluted by a large bulk of inert material. They are more readily removed. The cost of treatment for their removal can thus be reduced. We may treat each one of the fractions or cuts containing gum-forming constituents separately to remove the gum or gum-forming constituents or we may mingle them and treat them all together. In a general way, it is advantageous to treat the cuts separately in accordance with their gum content and gum-forming potentiality.

In order to refine or to remove gum and gum-forming constituents from a particular cut or mixture of cuts selected as containing a preponderance of such constituents, such cut or cuts may be subjected to a treatment with sulfuric acid of about 80 to 90 per cent concentration in the amount of about 3 to 6 pounds per barrel. This treatment is lighter than the usual acid treatment for removing gum but is effective because of the high concentration and reactivity of the unstable hydrocarbons. After such an acid treatment the material may be washed with dilute caustic soda solution to neutralize, then washed with water, and finally re-distilled.

In another way of treating to remove gum and gum-forming constituents, we may contact with fullers earth in the vapor phase. In still another way, we may heat under high pressure to polymerize using a temperature of about 750°–800°

F. and a pressure of about 1000 pounds per square inch, or we may hydrogenate differentially, using a small amount of hydrogen. This small amount of hydrogen may often be used in the absence of a catalyst because of the high concentration and reactivity of the gum and gum-forming constituents.

Another way of treating these special cuts or mixtures of cuts is to oxidize the gum-forming constituents by heating with air or oxygen in a closed container. Chemical oxidizing agents are also useful. An oxidizing treatment with air or oxygen can be conducted at relatively low temperatures, thus obviating the disadvantages incurred in prior oxidizing methods. In prior methods, in order to obtain a commercial rate of reaction in this process, it was necessary to employ temperatures of from 450° to 600° F. or above. But at these temperatures, it has been found that large quantities of gum and other deleterious ingredients are produced. The oxidation goes too far. The reaction thus causes the production of the very substances it is desired to eliminate. Hence such methods have not found commercial application. In our process, on account of the high reactivity of the gum-forming constituents, temperatures ranging from 200° to 300° F. can be employed commercially. This range is well below the temperatures at which side reactions occur.

After such an oxidizing treatment it is advantageous to treat with acid and alkali or with alkali alone and then to wash with water for removal of the oxidation products. In many instances re-distillation of such a treated cut or mixture of cuts is not necessary. Special chemical treatment to remove oxidation products is sometimes desirable.

The gum may also be removed and the gum forming constituents eliminated or reduced by treating the separated cuts with maleic anhydrid. The reaction product is sometimes entirely insoluble and the improved liquid may therefore be decanted off or distilled. In other cases extraction of the reaction product is required. Only a small amount of maleic anhydrid is required, say from 0.2 to 0.5 per cent. Other chemicals which have a preferential action on gum-forming constituents and which can be employed in our process are acrolin, crotonic-aldehyde, itaconic anhydrid, acrylic acid and citraconic anhydrid. The products of the reaction with these chemicals are all insoluble, non-volatile or otherwise easily removable. In general, the closer the fraction, the more likely is the product to be insoluble and thus easily removable. A mixture of two or more of the above chemicals may be used in small proportions, say not over 0.10 per cent by weight.

Ordinarily the light ends and the heavier ends of the distillate from which the intermediate gum containing fractions have been isolated or removed do not need any special purifying treatment except, perhaps, the usual treatment with doctor solution (sodium plumbite, which takes out mercaptans, etc.). The doctor solution may be used on the degummed and specially treated cuts prior to their admixture with the bulk of the distillate remaining after the isolation of such cuts; or the mixture as a whole may be treated with doctor solution after union of the isolated cuts.

In our unstable isolated fractions the gum or the gum-forming constituents appear to exert an auto-catalytic activity. The rate of formation of gum by a given quantity of such constituents depends upon their concentration. This rate may be greatly decreased on dilution with inert matter. For example we have found that the total gum formed in a united distillate in a given period of time is considerably less in bulk than that formed from the same quantity of the same distillate when separated into cuts some of which contain high proportions of gum-forming constituents. A high concentration of these constituents evidently accelerates their activity. Accordingly, one important feature of our invention is the re-uniting of the separated cuts with the bulk of the distillate directly after purification. The purification itself should be conducted as rapidly as possible.

It is believed that the practical operation of our invention is made clear in the above description. However, several specific methods of conducting our process may be mentioned. Cuts may be taken only at the peaks of the curves, such as those of Fig. 1, showing available gum content, the extent and amount of the cuts taken varying with the heights of the peaks and with their breadth. It is evident from the curves in Fig. 1 that gasolines in general may be purified by taking no more than three cuts, say between the temperatures of 155°–175° F., 205°–225° F. and 255°–275° F. On the other hand, at times it is more advantageous to make a single cut at 155°–175° F. and a larger cut between the temperatures of about 205°–275° F., since the gum content is high throughout the whole latter region. In case pressures other than atmospheric are employed in fractionation, a corresponding allowance must, of course, be made in the above boiling point ranges.

For certain types of gasoline slightly different procedures may be followed. For example, referring to the curves of Fig. 1, the pressure still distillates (curves II and III) may be sufficiently purified by separating a single cut between the temperatures of about 195°–285° F. This cut will consist of about ⅓ of the total distillate. The peak which occurs at temperatures between 165°–175° F. may be disregarded for this particular type of distillate if substantial refining only is required. In general, the peaks occurring in the available gum curves are of particular importance since these peaks show the occurrence of the most actitve gum-forming constituents, and these, presumably, exhibit the most marked auto-catalytic activity. When these particular cuts are eliminated from a gasoline the remainder forms a stable motor fuel.

While we have described what we consider the best embodiments of our invention, various modifications can be made without departing from the scope thereof. Our invention in a broad sense comprises the product produced as well as the process of separating from a cracked naphtha distillate or a distillate consisting chiefly of gasoline an intermediate fraction containing gum-forming constituents, quickly treating it for the elimination of the said gum-forming constituents and immediately thereafter adding the so purified fraction to the bulk of the distillate. Any method of treatment of the separated fraction for removal of the gum-forming constituents may be employed but the more rapid the method the more advantageous.

What we claim is:

1. In the manufacture of a motor fuel, the process which comprises subjecting a cracked, pressure still gasoline distillate to fractional distillation, treating cuts taken at temperatures between about 155°–175° F., 205°–225° F. and 255°–275° F. for removal of gum and gum forming constituents and adding the so-treated cuts to the bulk of the said gasoline distillate.

2. In the manufacture of motor fuels from cracked naphtha distillates consisting chiefly of gasoline, the process which comprises removing from such distillates at least three intermediate cuts containing a preponderance of the gum and gum-forming constituents, these cuts being taken at temperatures between about 155°–175° F., 205°–225° F. and 255°–275° F., heating these three removed cuts in a closed container to temperatures ranging from about 200° to 300° F. in the presence of a small amount of oxygen, removing the oxidation products thereby produced, and uniting the so purified cuts with the bulk of the distillate from which they were derived.

3. The process of claim 2 wherein the treated cuts are added to the bulk of the distillates from which they were derived immediately following treatment for removal of gum and gum-forming constituents.

4. In the manufacture of motor fuels from cracked naphtha distillates consisting chiefly of gasoline, the process which comprises removing from such distillates two intermediate cuts containing a preponderance of gum and gum-forming constituents, these cuts being taken at temperatures between about 155°–175° F. and 205°–275° F., treating these two removed cuts to eliminate gum and gum-forming constituents and uniting the so purified cuts with the bulk of the distillate from which they were derived.

5. The process of claim 4 wherein the treated cuts are added to the bulk of the distillate from which they were derived immediately following treatment for removal of gum and gum-forming constituents.

6. In the manufacture of motor fuels from cracked naphtha distillates consisting chiefly of gasoline, the process which comprises removing from such distillates at least two intermediate cuts containing a preponderance of gum and gum-forming constituents, these cuts being taken at temperatures between about 155° to 175° F. and 205° to 275° F., heating these two removed cuts in a closed container to temperatures ranging from about 200° to 300° F. in the presence of a small amount of oxygen, removing the oxidation products thereby produced, and uniting the so purified cuts with the bulk of the distillate from which they were derived.

7. The process of claim 6 wherein the treated cuts are added to the bulk of the distillates from which they were derived immediately following treatment for removal of gum and gum-forming constituents.

8. In the manufacture of motor fuels from cracked naphtha distillates consisting chiefly of gasoline, the process which comprises removing from such distillates at least three intermediate cuts containing a preponderance of the gum and gum-forming constituents, these cuts being taken at temperatures between about 155°–175° F., 205°–225° F. and 255°–275° F., heating these three removed cuts in a closed container to temperatures ranging from about 200° F. to 300° F. in the presence of a small amount of oxygen, thereby converting the gum and gum-forming constituents to more readily removable form, distilling the oxygen treated cuts to obtain relatively gum free distillate therefrom, and reuniting the so purified material with the bulk of the distillate from which it was previously separated.

9. In the manufacture of motor fuels from pressure still distillates consisting chiefly of gasoline, the process which comprises removing from such distillates at least one intermediate cut containing a preponderance of gum and gum-forming constituents, this cut being taken within the limits of a temperature range of about 195° to 285° F., treating this cut to eliminate gum and gum-forming constituents, and uniting the so purified cut with the bulk of the distillate from which it was derived.

10. In the manufacture of motor fuels from pressure still distillates consisting chiefly of gasoline, the process which comprises removing from such distillates at least one intermediate cut containing a preponderance of gum and gum-forming constituents, this cut being taken within the limits of a temperature range of about 195° to 285° F., heating this cut in a closed container to temperatures ranging to about 200° to 300° F. in the presence of a small amount of oxygen, removing the oxidation products thereby produced and uniting the so purified cut with the bulk of the distillate from which it was derived.

11. In the manufacture of motor fuels from pressure still distillates consisting chiefly of gasoline, the process which comprises removing from such distillates at least one intermediate cut containing a preponderance of gum and gum-forming constituents, this cut being taken within the limits of a temperature range of about 195° to 285° F., heating this cut in a closed container to temperatures ranging from about 200° to 300° F. in the presence of a small amount of oxygen, thereby converting gum and gum-forming constituents to more readily removable form, distilling the oxygen treated cuts to obtain relatively gum-free distillate therefrom and re-uniting the so-purified material with the bulk of the distillate from which it was previously separated.

SAMUEL M. MARTIN, Jr.
WILLIAM A. GRUSE.